United States Patent
Huang et al.

(10) Patent No.: US 8,229,728 B2
(45) Date of Patent: Jul. 24, 2012

(54) METHODS FOR USING MANUAL PHRASE ALIGNMENT DATA TO GENERATE TRANSLATION MODELS FOR STATISTICAL MACHINE TRANSLATION

(75) Inventors: Jun Huang, Fremont, CA (US);
Yookyung Kim, Los Altos, CA (US);
Demitrios Master, Cupertino, CA (US);
Farzad Ehsani, Sunnyvale, CA (US)

(73) Assignee: Fluential, LLC, Sunnyvale, CA (US)

( * ) Notice: Subject to any disclaimer, the term of this patent is extended or adjusted under 35 U.S.C. 154(b) by 880 days.

(21) Appl. No.: 11/969,518

(22) Filed: Jan. 4, 2008

(65) Prior Publication Data

US 2009/0177460 A1   Jul. 9, 2009

(51) Int. Cl.
*G06F 17/20* (2006.01)
*G06F 17/21* (2006.01)
*G06F 17/28* (2006.01)
(52) U.S. Cl. .................... 704/4; 704/1; 704/10
(58) Field of Classification Search .......... 704/4
See application file for complete search history.

(56) References Cited

U.S. PATENT DOCUMENTS

| 6,912,499 | B1 * | 6/2005 | Sabourin et al. | 704/243 |
| 7,533,013 | B2 * | 5/2009 | Marcu | 704/2 |
| 2002/0040292 | A1 * | 4/2002 | Marcu | 704/4 |
| 2004/0243390 | A1 * | 12/2004 | Pinkham | 704/2 |
| 2006/0142995 | A1 * | 6/2006 | Knight et al. | 704/9 |
| 2007/0203689 | A1 * | 8/2007 | Wu et al. | 704/2 |

* cited by examiner

*Primary Examiner* — Justin Rider
(74) *Attorney, Agent, or Firm* — Fish & Associates, PC

(57) ABSTRACT

The present invention adopts the fundamental architecture of a statistical machine translation system which utilizes statistical models learned from the training data and does not require expert knowledge for rule-based machine translation systems. Out of the training parallel data, a certain amount of sentence pairs are selected for manual alignment. These sentences are aligned at the phrase level instead of at the word level. Depending on the size of the training data, the optimal amount for manual alignment may vary. The alignment is done using an alignment tool with a graphical user interface which is convenient and intuitive to the users. Manually aligned data are then utilized to improve the automatic word alignment component. Model combination methods are also introduced to improve the accuracy and the coverage of statistical models for the task of statistical machine translation.

30 Claims, 4 Drawing Sheets

속이 새벽에 쓰리고 배가 너무 빨리 고파져요 i have heartburn in early morning and feel really hungry at short interval

속이 새벽에 쓰리고  배가 너무 빨리 고파져요 i have heartburn in early morning and feel really hungry at short interval

Figure 2

METHODS FOR USING MANUAL PHRASE ALIGNMENT DATA TO GENERATE TRANSLATION MODELS FOR STATISTICAL MACHINE TRANSLATION

FIELD OF INVENTION

The present invention relates to automatic translation systems, and, in particular, methods to improve a statistical machine translation (SMT) systems.

BACKGROUND

Significant progress has been made in the area of statistical machine translation (Brown et al. 1993, Chiang 2005, Koehn et al. 2003), but one bottleneck in building a machine translation system with commercial quality is to obtain enough training data. It is well known that with the more data the better quality one can accomplish with statistical methods. With more training data, better word alignments can be achieved, and good word alignment quality results in good translation quality because the various models in a SMT system, such as, for example, the lexicon model, fertility model, distortion model and phrase table mainly depend on the quality of word alignment. However, it is not practical to collect millions of parallel sentences for rapid development of SMT systems.

This motivates the present invention in providing methods for improving word alignments, accordingly the translation quality can be improved with limited training data by employing manual alignment at the phrase level, extracting alignment patterns, and learning word alignment models from small amount of manually tagged data.

SUMMARY OF THE INVENTION

An object of the present invention is to devise methods which enable high quality word alignment to improve automatic translation quality by incorporating a small amount of data generated by manual efforts.

The present invention avoids expert knowledge needed for rule-based machine translation systems. It adopts the fundamental architecture of a statistical machine translation system which utilizes statistical models learned from the training data. It involves a fairly simple manual task that any bilingual speaker can perform without extensive linguistic training.

Out of the training parallel data (set of source sentences and translated target sentences), a certain amount of sentence pairs are selected for manual alignment at the phrase level instead of at the word level. Depending on the size of the training data, the optimal amount for manual alignment may vary. Selected sentence pairs are manually aligned using an alignment tool with a graphical user interface which is convenient and intuitive to the users.

Manually aligned data are utilized to improve the automatic word alignment component. They are used either for semi-supervised training or supervised training of the word alignment of the rest of the training data. Manually aligned data are also utilized to augment an automatically generated phrase table. The alignment tool generates a phrase mapping list as specified by users, and the phrase mappings are added to phrases that are automatically extracted from word alignment in a SMT training step. Model combination methods are also introduced to improve the accuracy and the coverage of statistical models for the task of statistical machine translation.

DESCRIPTION OF DRAWINGS

The foregoing and other objects, aspects and advantages of the invention will be better understood from the following detailed description of the preferred embodiments of this invention when taken in conjunction with the accompanying drawings in which:

FIG. 2 is an example of phrase aligned Korean and English sentences.

DETAILED DESCRIPTION OF THE PREFERRED EMBODIMENTS

Selection of Sentences

In the preferred embodiment of this present invention, a subset of the training data is manually aligned. Although no expert skill is necessary, it is desirable to minimize manual efforts. Hence, it is essential to employ an effective method for selecting sentences to be manually aligned.

There are several ways for selecting a subset from a data set. First, a random selection is a reasonable way in that no bias is applied in the selection process and hence it can be expected to help with the overall word alignment. Common words are most likely to be included in the random selection process and be included in the accurate manual alignment effort, which leads to a balanced improvement in the supervised training process for word alignment.

Second, one can order training sentence pairs with respect to the frequency of words in sentences, and select sentences that have many rare words. The underlying assumption is that automatic word alignment using an EM (expectation maximization) algorithm such as in Giza++ tends to achieve good results on common word pairs but performs poorly for rare words. Hence if manual guidance is added to difficult word alignments, it would effectively help with the overall word alignment. This method has a good potential when the training size is large and most of the common words are aligned correctly.

Third, one can select sentences by selecting sentences that are difficult to translate by a SMT system. To select such sentences, we first translate the source sentences of the training data with an available baseline SMT system and compare the results with the target sentences as a reference and measure the quality with an automatic evaluation criterion such as BLEU (Papineni 2001). Based on the automatic evaluation, we select the low performing sentences. We found this third method most effective. By selecting 10% of the training data in this way, we could improve the translation quality by as much as 50%.

Alignment Tool

Figure 1:
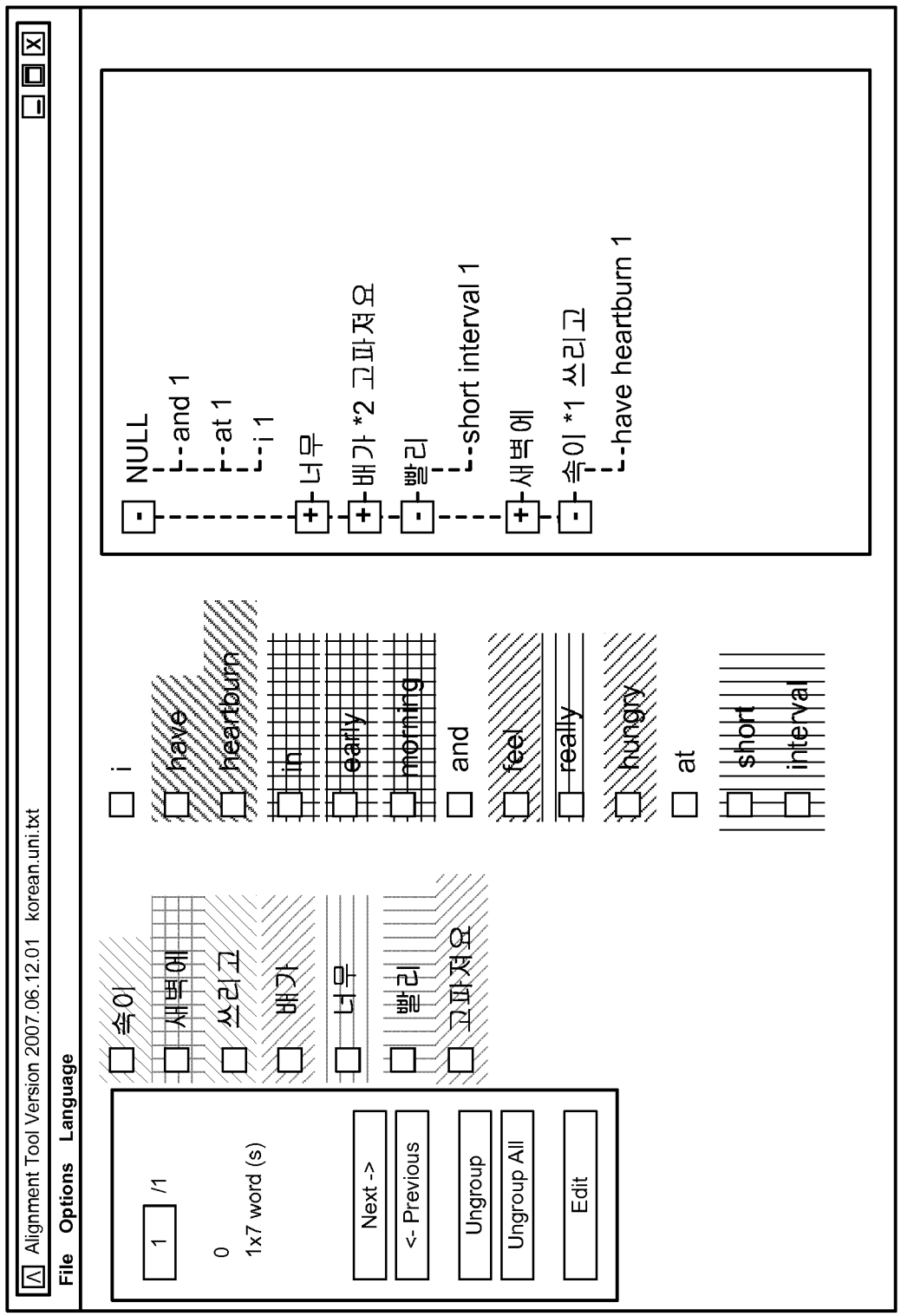
FIG. 1 is a snapshot of a manual alignment tool.

FIG. 1 is a snapshot of a manual alignment tool. To facilitate the task of manual word alignment, such a tool is developed. The tool has a graphic user interface, and the user can select words in the source and the target side to align. The alignment is marked with color. To accommodate not only one to one alignment but one to many or many to one or null alignment, the tool allows users to select one or many words in one language and then align to one or many words in the other language. For one-to-one alignment, a word in the source language sentence is clicked and then the corresponding word in the target language sentence is clicked. Then the two words are marked with the same color highlight. For a many-to-one alignment relation, one needs to click multiple words in one side (either the source or target language sentence) first and then click a word in the other side. Then the tool marks the clicked words in both sides with the same color to indicate the alignment link. If some alignment link should be corrected, the particular word can be selected to ungroup or all the links of the sentence can be erased.

The tool shows one sentence pair to align at one time, and lets users to choose a sentence to align by selecting sentence ID. In addition to the sentence alignment pane, the tool has a separate pane to show the cumulative alignment results. For each alignment link between words or phrases in the source and target sentence, the alignment result is updated and shown in the pane to review. This cumulative alignment results are useful to check and compare various target words or phrases aligned to a particular source word and phrase. The result pane also allows users to look up all the sentences containing the particular alignment.

To save time in manual alignment, the tool automatically aligns any word or phrase pairs which are already aligned in the previous part of the file. The alignment is indicated by color highlight, and can be corrected if some correction is necessary given context.

The tool takes various input formats. It can start with simple sentence pairs without any prior word alignment information, or it can take sentence pairs along with some automatic word alignment information. In the latter case, bilingual speakers need to verify the alignment and correct them as necessary. Depending on situation, one can be more efficient than the other. If there is a large amount of training data, and the automatic word alignment is acceptable, it can be more efficient to provide some alignment to correct rather than for the users to do all the alignment from scratch.

To extract n-gram bilingual phrase mappings out of the manual alignment results, one can choose options for phrase mapping, such as the maximum n-gram, maximum words to be in a phrase, and whether to include null aligned words in adjacent phrase mappings.

Direct Addition to Phrase Table

The resulting phrase table can be added to a phrase table generated by a SMT training system such as Moses (http://www.statmt.org/moses/). In the present embodiment, we add the manual phrase pairs to the phrases extracted from automatic word alignment and calculate the probability by a regular SMT training step. This direct addition is especially beneficial when the size of training data is small and the automatic word alignment quality is not good. As explained below, the manually aligned sentences are used to guide or train automatic word alignment, but the learned word alignment is not still perfect. Hence, the direct augmentation of phrase table is useful in addition to the improvement of word alignment.

Alignment Pattern Extraction

FIG. 2 is an example of phrase aligned Korean and English sentences. From this manually aligned source and target phrases, we can extract various alignment patterns and structural information for statistical machine translation. First, we can observe one-to-many and many-to-many relationships between source and target words. For example, the second Korean word in FIG. 2 is mapped to fourth, fifth, and sixth words in the English sentence. The first and the third word in the Korean sentence are mapped to the second and third words in the English translation. This phrase alignment also embodies the skipping pattern in which means words in discontinuous positions in one language can be translated into words in either continuous, or discontinuous positions in another language. Second, we can also extract cohesive translation information between source and target languages. For example, the first English word (I) in FIG. 2 is not a literal translation to any Korean words in the source sentence. However, we can append this word with some specific English words in order to have the translation to be grammatical and semantically correct. The cohesive translation information can be extracted from the dependency links embedded in the manually annotated data. Third, we can also extract linguistic information, such as lexicalized forms, and parts-of-speech (POS) tags from aligned source/target words, and utilize such information to improve the accuracy of the estimated word alignment model, and subsequently the final translation model for the task of machine translation.

Figure 3:
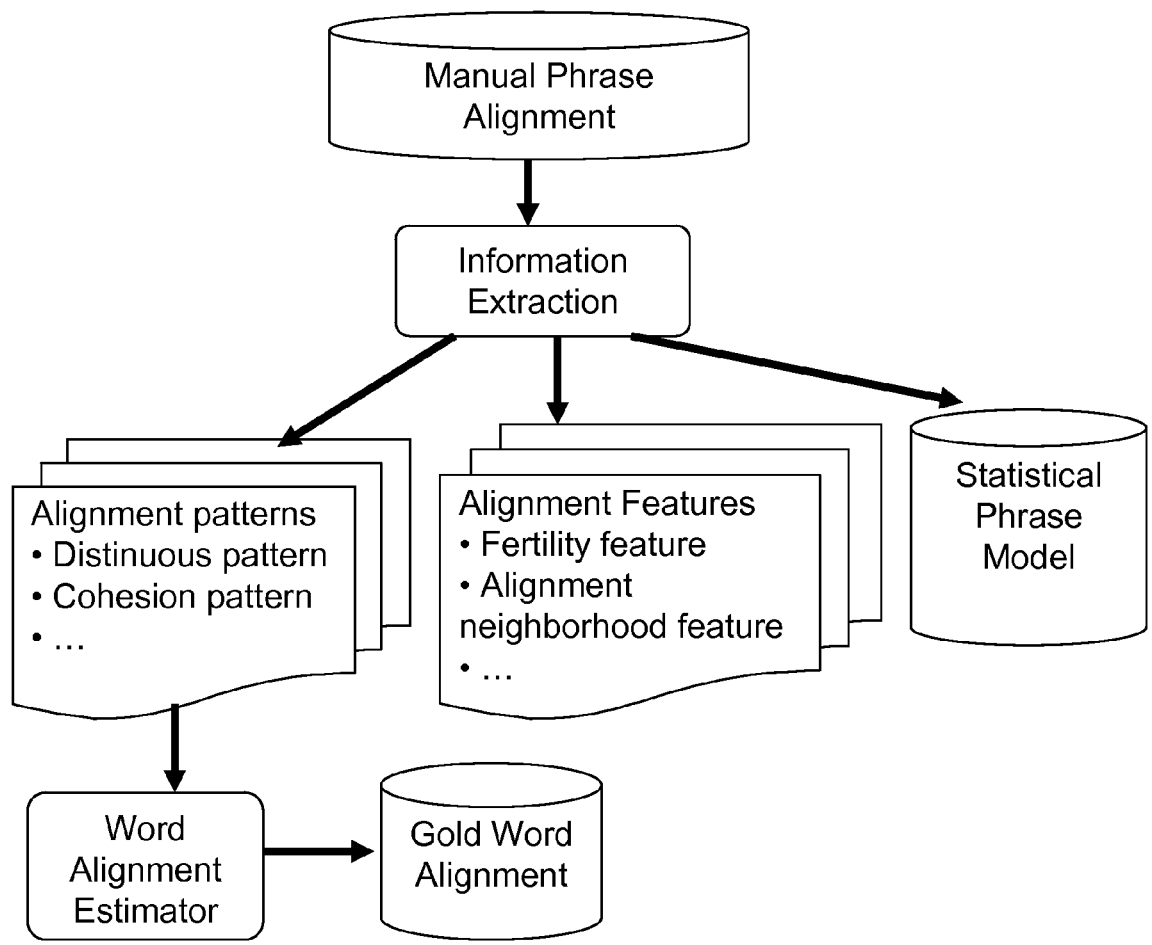
FIG. 3 is an illustration of the procedures to extract alignment features, alignment patterns, and statistical phrasal models from manually annotated phrase alignment data.

FIG. 3 is an illustration of the procedures to extract alignment features, alignment patterns, and statistical phrasal models from manually annotated phrase alignment data. The alignment patterns include, but not limited to, discontinuous alignment patterns, cohesion patterns derived from dependency links, and lexicalized alignment patterns. The alignment features include, but not limited to, fertility feature, alignment neighborhood feature, output of input aligner feature, lexicalized surfaceform feature, parts-of-speech (POS) feature, and source-target word pair feature. The statistical phrasal model includes, but not limited to, point-wise mutual information (PMI) model, dice coefficient model, and semantic entropy model. These procedures also estimate word alignment, which will be utilized as training reference of supervised learning of word alignment model.

Manual alignment also provides guidance to automatic word alignment. We utilize a small amount of phrase aligned parallel sentences labeled by language experts, and design information extraction and learning algorithms to induce the alignment patterns, linguistic and statistical features, and induced gold word alignments (also referred to as just "word alignments"). We further incorporate this extracted information into both unsupervised and supervised machine learning (ML) systems, to estimate word alignment with rich linguistic and statistical information.

From human annotated data, we extract four types of alignment patterns to guide unlabelled word alignment.

The first pattern contains the alignment positions of source and target word(s), which also allows discontinuity for both source and target languages. This pattern transforms phrase alignment links into word alignment links, and also solves the non-continuous alignment problem between source and target languages.

The second pattern contains all information embedded in first pattern, with additional dependency information inferred from neighboring alignment links. This new feature corresponds to probable alignment links in word alignment model, and can provide additional information to improve the grammaticality of target translation.

The third pattern extends the first pattern with additional lexicalized information and some other linguistic information such as Parts-of-Speech (POS) when it's available. This pattern incorporates some structural information into statistical word alignment model to improve the quality of the word alignment model.

The fourth pattern extends the second pattern with additional lexicalized information and some other linguistic information such as Parts-of-Speech (POS) when it's available. This pattern incorporates some structural information into the statistical word alignment model to improve the quality of the word alignment model.

The extracted alignment patterns are utilized to address the problems of long distance movement, translation divergence, and translation dependency in machine translation. This approach avoids the procedure of labeling and parsing both source and target languages, which is time-consuming and error-prone, and still improves the quality of word alignment using learned and extracted linguistic and statistical information.

Note that as used herein a reference to the term "word alignment" means the alignment of words between the source and target sentences, while the term "word alignment model" means the statistical models learned from the labeled or unlabeled training data which models the translation equivalence between source and target words. The word alignment models can be used to receive source and target parallel sentences as input and generate word alignments as output.

Machine Learning of Word Alignment Model

Figure 4:
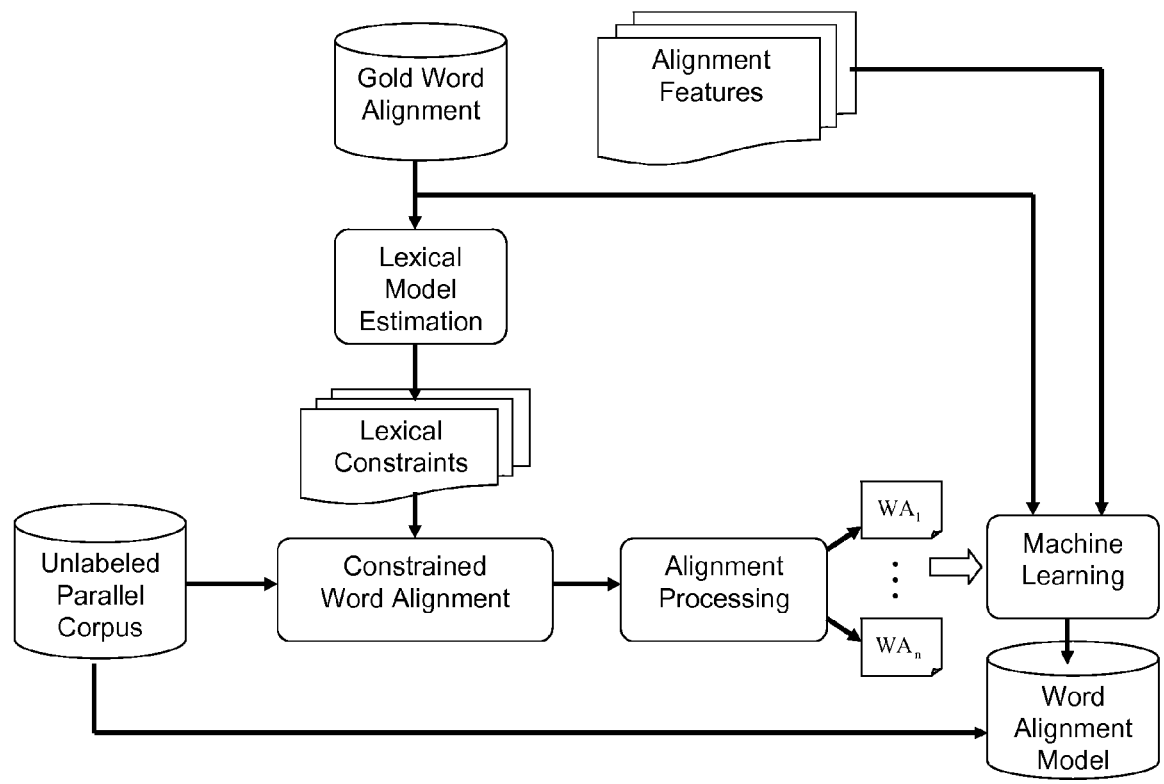
FIG. 4 is an illustration of the system architecture of machine learning based word alignment estimation.

FIG. 4 is an illustration of the system architecture of machine learning based word alignment estimation. The system takes inputs from unlabelled parallel corpus, gold word alignment derived from phrase aligned data, and alignment features extracted from different word alignments. The output is estimated final word alignment model. We estimates lexical model from gold word alignment, and utilizes it as lexical constraints for unsupervised learning of word alignment model. The estimated word alignment models in both source-to-target and target-to-source direction are further processed to generate different word alignment outputs. These alignment inputs, along with extracted alignment features, are feed into a machine learning system to generate final word alignment model for the task of statistical machine translation.

In next step, we designed a learning algorithm to automatically estimate gold word alignment from phrase alignment data. The gold word alignment will provide important WA information in following aspects. First, we can estimate priori lexical model based on estimated word alignment data, and utilize it as constraints during the iterative learning stage of unsupervised WA. Second, we can use derived WA as training data for supervised learning based word alignment, and utilize learned statistical models to estimate new WA's for another unlabelled training corpus.

After we estimated gold word alignment from manually aligned phrases, we introduced an unsupervised learning algorithm to improve the WA model for another un-annotated training data set.

The key idea is to further derive lexical model from automatically generated word alignment data, and use it to constrain the iterative estimations of the new WA model. The lexical model is estimated from the conditional probabilities of translation equivalence based on word alignment links derived from phrase alignments. We estimate the lexical models for both source-to-target and target-to-source direction.

The next step is to utilize the estimated lexical model to improve the iterative estimation of word alignment model from unlabelled parallel training corpus. Given a source sentence e, a target sentence f, and their corresponding word alignments a, an unsupervised learning algorithm, such as expectation-maximization (EM), tries to iteratively maximize the expected complete log-likelihood, which is defined as follows:

$$a^* = \arg\max_{a \in A} \{\langle \log p(f, a | e) \rangle_{q(a)} + H(q(a))\} \quad (1)$$

Where q(a) is the auxiliary function and H(q(a)) is the entropy of q(a). The auxiliary function can be defined as the log-likelihood of the lexical translation given current source-target word pairs and its corresponding alignment. We can guarantee that during each iteration, the value of the objective function is non-decreasing according to Jansen's inequality in information theory.

During the M-step, the learning algorithm tries to maximize the expected complete log-likelihood with the entire set of all possible word alignment links A derived from current model parameters. We modified the above optimization criterion, so that it constrains the search space of model parameters for a small set of manually verified translation lexicon. For source-target word pairs existing in the manual translation lexicon, we only allow for word alignments derived from these highly accurate lexical translation. For all other translation lexicon pairs, we allow the learning algorithm to estimate next iteration of model parameters from the set of all possible automatically derived alignment links, subject to the global alignment constraints.

Our algorithm further provides an option to combine different lexicon model estimation approaches with the ML word alignment during each iteration of the model training. As a result, our system is more flexible in terms of the integration of the lexicon model and the word alignment during the iterative estimation, and thus improves both predictability and precision of the estimated lexicon model and word alignment.

This algorithm can not only improve the precision of word alignments derived from manual translation lexicon, but also the automatically derived alignment links because it percolates some unreliable alignment paths due to global alignment constraints.

In next step, we introduce two machine learning (ML) algorithms to further improve the estimation of WA model, using labeled and unlabeled WA training data. In first approach, we use a small amount of manually labeled word alignments as training data, and utilize a MaxEnt model to recombine n different WA systems for final alignment estimation.

Given a collection of evidences (training samples), MaxEnt chooses a model consistent with all the evidences, but other as uniform as possible. The evidences are represented as feature functions, i.e. binary valued functions that map a class y and a context x to 0 or 1. In this project, we use different WA systems from GIZA++, such as intersection (INT), union (UN), and grow-diag-final (GDF) as the input of MaxEnt WA model, and train the MaxEnt model using Generalized Iterative Scaling (GIS) algorithm. The final WA is generated according to following model:

$$p(y | x) = \frac{1}{Z_x} \exp\left(\sum_{m=1}^{M} \lambda_m h_m(y, x)\right) \quad (2)$$

Where x is the context and y is the output class, $h_m(y,x)$ is the feature function and $\lambda_m$ is its associated model parameter, and $Z_x$ is a normalization constant.

For each alignment link (i, j), we extract following linguistic and statistical features for MaxEnt-based WA:

Output of input aligner (o): whether (i,j) exists in a given input alignment $A_k$.

Alignment neighbor (n): A neighborhood of an alignment link (i,j), denoted by N(i, j), consists of eight possible alignment links in a 3×3 window with (i,j) in the center of the window. Each element of N(i, j) is called a neighboring link of (i,j). The current neighbor feature includes whether a particular neighbor of (i,j) exists in a given input alignment $A_k$.

Fertility (f): The number of words that $e_i$ or $f_j$ is aligned to in a given input alignment $A_k$.

Monotonicity (m): The absolute distance between alignment positions i and j.

Lexicalized surfaceform (s): Whether the lexicalized source-target surfaceform exists in a given input alignment $A_k$.

Part-of-speech (POS) tags (p): POS tags for current source and target words.

Source-Target word pair (w): Whether the aligned source-target word pair exists in a given input alignment $A_k$.

In the second approach, instead of using manually generated word alignments as training reference, we use a Maximum NIST (MaxNIST) score or Maximum BLEU (MaxBLEU) score criterion to select the "best" alignment as training reference in terms of sentence level NIST score. First, we train statistical models using unsupervised learning with different word alignment models, such as union, intersection, and grow-diag-final. Then we decode the entire training corpus using different models, and evaluate the sentence-level NIST/BLEU scores using the target sentences within the parallel corpus. For each sentence, we select the word alignment with highest NIST/BLEU score as the gold word alignment, and utilize it as automatically generated references for future model estimation. In this way, we can automatically generate word alignment training data from large amount of unlabeled parallel corpus, without resort to labor extensive efforts of manually annotating word alignment data.

Then we use ML models, such as MaxEnt and support vector machines (SVM), to predict model parameters associated with the input alignments, and the extracted WA features. We also consider one additional property for each WA feature described above. We can either consider the existence of a specific WA feature in input alignments, and adopt a binary value function for feature contribution, or use the actual occurrence frequency of each feature, as the weighting parameters in ML models.

In next step, we utilize the ML models learned from labeled word alignment training data to improve the WA model estimation in unlabelled training corpus. We train WA models with different alignment schemes, such as INT, UN, and GDF with lexical constraints derived from golf word alignment. Then we extract statistical and linguistic alignment features in a similar fashion as the learning stage. For each parallel sentence, we produce various alignment links based on different WA models, then we utilize ML models to dynamically select optimal alignment links from different links.

We treat the optimal alignment link selection as a classification problem. Base on extracted alignment features, and the ML model learned from labeled data, we compute the posteriori probability of each input alignment link given observed evidences. Subsequently, we use the classification result to guide the selection of optimal alignment links with one-to-many or many-to-many constraints between source and target sentences.

In next step, we re-estimate the translation model based on improved word alignment model, and perform machine translation decoding using the new statistical model. We further estimate the optimal word alignment with Maximum NIST/BLEU score criterion, and derive new optimal word alignment training data for next iteration of the word alignment model lexical model estimation. We perform this boost-strapping procedure in an iterative fashion, and guarantee the accuracy of estimated statistical models improves after each iterations, until the training reach a predefined stop criterion (i.e., the relative improvement is less than 5%).

Multi-Level Statistical Model Combination

We also introduce innovative technology of statistical model learning with scarce resources, via statistical model fusion, combination of manual phrase alignment and automatically inducted phrases at different model granulites, and selective model training.

The hybrid model learning algorithms can be outlined as follows.

First, we applied unsupervised learning algorithm to estimate new WA models using the structural information extracted from human annotation, and estimated new phrase translation models from the word alignment level training data. The translation model learned from this granularity is denoted as word alignment derived translation model.

Second, we utilized the phrase map information extracted from human annotated data to augment the extracted phrases learned from parallel corpus. The augmented source-target phrases are passed onto a phrase model estimator to learn the final translation model based on the co-occurrence frequency of extracted source-target phrases. The translation model learned from this granularity is denoted as phrase level augmented translation model.

At the third level of model granularity, we further augmented the statistical model learned from improved WA models, with the phrase map information extracted from manual annotation. The model learned from this granularity is denoted as hybrid translation model.

Finally, we designed a model combination algorithm which combines the statistics from models learned at three different levels, and harness the synergy between extracted structural information and automatically induced statistical information, to generate the final translation model with higher coverage, and attained precision from each individual sub-models. In model combination step, we first rank the target translation options according to weighted translation probabilities, such as source-to-target conditional probability, target-to-source posteriori probability, lexical translation probability, and phrase length normalization score. We further augment the final translation model with unique source-target translation pairs, which are not present in the models to be augmented. Finally, we utilize model normalization and combination technique to re-rank the source-target phrasal translations which occurs in multiple models. The final model has the same precision as each individual model, yet with higher predictability and coverage for the task of statistical machine translation.

While the present invention has been described with reference to certain preferred embodiments, it is to be understood that the present invention is not limited to such specific embodiments. Rather, it is the inventor's contention that the invention be understood and construed in its broadest meaning as reflected by the following claims. Thus, these claims are to be understood as incorporating not only the preferred embodiments described herein but also all those other and further alterations and modifications as would be apparent to those of ordinary skilled in the art.

We claim:

1. A method for generating one or more translation models for a statistical machine translation system, comprising the steps of:
    selecting a plurality of parallel sentences having one or more phrases using at least one of word occurrence frequency information and a minimum BLEU score criterion, each of said parallel sentences having a source language sentence and a target language sentence;

manually aligning, via an alignment tool, words and phrases between said source language sentences and said target language sentences of said parallel sentences;

extracting alignment patterns from said manually aligned sentences;

estimating word alignments from said alignment patterns;

estimating one or more word alignment models to generate one or more final word alignments;

extracting source-target phrases using the final word alignments; and estimating the one or more translation models from the extracted source-target phrases.

2. The method of claim 1 wherein the selecting step is performed using word occurrence frequency information.

3. The method of claim 1, wherein the extracting alignment patterns step is performed with discontinuity information from manually annotated data.

4. The method of claim 3 wherein the extracting alignment patterns step is performed with additional dependency link information.

5. The method of claim 3 wherein the extracting alignment patterns step is performed with additional lexical and structural information.

6. The method of claim 4 wherein the extracting alignment patterns step is performed with additional lexical and structural information.

7. The method of claim 1 wherein in the estimating word alignment step, the word alignments are estimated from manually generated phrase alignment.

8. The method of claim 1 wherein extracted alignment patterns are used to automatically generate word alignments.

9. A method of claim 1, wherein the estimating word alignment models step includes the substeps of:

estimating a lexical model from the word alignments;

generating lexical constraints from the lexical model;

constraining the learning of word alignments from an unlabelled parallel corpus;

processing the constrained word alignments to generate one or more processed word alignments;

generating one or more word alignment models as a function of the processed word alignments, the alignment features, and the estimated word alignments estimated from said alignment patterns; and generating one or more final word alignments.

10. The method of claim 9 further including the following step: using said word alignment models to generate word alignments from an unlabelled parallel corpus.

11. The method of claim 9 wherein the word alignment models and the lexical model are iteratively estimated.

12. The method of claim 1, wherein statistical and linguistic features are extracted from different alignments to generate the alignment features.

13. The method of claim 1, wherein in the estimating word alignments step, the word alignments are automatically generated from maximum NIST score criterion.

14. The method of claim 1, wherein in the estimating word alignments step, the word alignments are automatically generated from maximum BLEU score criterion.

15. The method of claim 1, wherein automatically extracted phrases are augmented with phrase map generated from an alignment tool to improve the estimation of the translation model.

16. The method of claim 1 wherein the translation model is estimated using the word alignment model and a phrase map.

17. The method of claim 1 wherein a plurality of said translation models are used to generate a final translation model.

18. A method for generating a translation model for a statistical machine translation system, comprising the steps of:

selecting a plurality of parallel sentences having one or more phrases using at least one of word occurrence frequency information and a minimum BLEU score criterion, each of said parallel sentences having a source language sentence and a target language sentence;

manually aligning, via an alignment tool, words and phrases between said source language sentences and said target language sentences of said parallel sentences;

extracting alignment patterns from said manually aligned sentences;

estimating word alignments from said alignment patterns;

extracting source-target phrases using the word alignments; and estimating the one or more translation models from the extracted source-target phrases.

19. The method of claim 18 wherein the manual aligning step is performed at the phrase level.

20. The method of claim 18, wherein the extracting alignment patterns step is performed with discontinuity information from manually annotated data.

21. The method of claim 20 wherein the extracting alignment patterns step is performed with additional dependency link information.

22. The method of claim 20 wherein the extracting alignment patterns step is performed with additional lexical and structural information.

23. The method of claim 21 wherein the extracting alignment patterns step is performed with additional lexical and structural information.

24. The method of claim 18 wherein in the estimating word alignments step, the word alignments are estimated from manually generated phrase alignment.

25. The method of claim 18 wherein extracted alignment patterns are used to automatically generate word alignments.

26. The method of claim 18, wherein statistical and linguistic features are extracted from different alignments to generate the alignment features.

27. The method of claim 18, wherein in the estimating word alignments step, the word alignments are automatically generated from maximum NIST score criterion.

28. The method of claim 18, wherein in the estimating word alignments step, the word alignments are automatically generated from maximum BLEU score criterion.

29. The method of claim 18, wherein automatically extracted phrases are augmented with phrase map generated from an alignment tool to improve the estimation of the translation model.

30. The method of claim 18 wherein the translation model is estimated using the word alignment model and a phrase map.

* * * * *